United States Patent
Galehr et al.

(10) Patent No.: US 11,866,090 B2
(45) Date of Patent: Jan. 9, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Robert Galehr, Schaanwald (LI); Balint Kalman Nagy, Montlingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/865,081

(22) Filed: Jul. 14, 2022

(65) Prior Publication Data

US 2023/0029013 A1 Jan. 26, 2023

(30) Foreign Application Priority Data

Jul. 22, 2021 (DE) ...................... 10 2021 207 887.7

(51) Int. Cl.
*B62D 1/185* (2006.01)
*B62D 1/184* (2006.01)

(52) U.S. Cl.
CPC ............. *B62D 1/185* (2013.01); *B62D 1/184* (2013.01)

(58) Field of Classification Search
CPC ................................ B62D 1/185; B62D 1/184
See application file for complete search history.

(56) References Cited

U.S. PATENT DOCUMENTS

| 8,505,407 | B2 |  | 8/2013 | Nomura et al. |  |
|---|---|---|---|---|---|
| 10,625,767 | B2 | * | 4/2020 | Suzuki | ................... B62D 1/184 |
| 2018/0022975 | A1 |  | 1/2018 | Kerber et al. |  |
| 2018/0354546 | A1 |  | 12/2018 | Kreutz et al. |  |
| 2019/0007743 | A1 |  | 1/2019 | Huang et al. |  |
| 2019/0047608 | A1 | * | 2/2019 | Ishikawa | ................ B62D 1/184 |

FOREIGN PATENT DOCUMENTS

| DE | 102018121780 | A1 | * | 3/2019 | ............... B62D 1/18 |
| EP | 2607206 | A2 | * | 6/2013 | ............ B62D 1/184 |
| EP | 3 315 381 | A1 |  | 5/2018 |  |
| EP | 3 429 907 | A1 |  | 1/2019 |  |
| GB | 2463137 | A | * | 3/2010 | ............ B62D 1/184 |
| JP | 2008 044498 | A1 |  | 2/2008 |  |
| JP | 2012171480 | A |  | 9/2012 |  |
| JP | 2015147542 | A | * | 8/2015 | ............ B62D 1/184 |
| JP | 2017197178 | A | * | 11/2017 | ........... B60R 25/021 |
| WO | 2015/124944 | A1 |  | 8/2015 |  |

* cited by examiner

*Primary Examiner* — Drew J Brown
(74) *Attorney, Agent, or Firm* — thyssenkrupp North America, LLC

(57) ABSTRACT

A steering column includes an outer jacket that is adjustably secured to a carrier unit and clamped to a telescopically adjustable inner jacket. The outer jacket has a tubular body with a clamping slot extending longitudinally. Opposing side plates disposed alongside the clamping slot extend longitudinally. The side plates are connected to the tubular body and each have a longitudinally-extending elongated hole spaced apart from the tubular body in an outer region that protrudes from the tubular body. A clamping bolt extends through the elongated holes and an opening of the carrier unit. The clamping bolt applies a clamping force to load the side plates. An inner region of each side plate is fixed to the tubular body. A support element is connected to each side plate between the elongated hole and the inner region and is connected to the tubular body in an edge region of the clamping slot.

16 Claims, 3 Drawing Sheets

STEERING COLUMN FOR A MOTOR VEHICLE

CROSS-REFERENCE TO RELATED APPLICATIONS

This application claims foreign priority to German Patent Application No. DE 10 2021 207 887.7, filed Jul. 22, 2021, the entire content of which is hereby incorporated by reference herein.

FIELD

The present disclosure relates generally to steering columns, including steering columns for motor vehicles.

BACKGROUND

Longitudinally adjustable steering columns for adapting the steering wheel position to the seating position of the driver of a motor vehicle are known, in which the steering wheel which is attached to the rear end of the steering spindle is able to be positioned in the longitudinal direction, i.e. in the direction of the steering column longitudinal axis in the vehicle interior.

The steering spindle is rotatably mounted in an adjusting unit about the longitudinal axis. The adjusting unit comprises an inner jacket which is also denoted as an internal or inner jacket tube. The inner jacket is received in a telescopically adjustable manner in the longitudinal direction in an outer jacket, also denoted as an external jacket tube, outer jacket tube or guide box. The outer jacket is held by a carrier unit attached to the vehicle body and for the longitudinal adjustment is adjustable in this case in the longitudinal direction relative to the carrier unit. For an optional vertical adjustment of the adjusting unit, the outer jacket may additionally be adjustable relative to the carrier unit in the vertical direction transversely to the longitudinal direction.

A clamping device is provided in a generic steering column which is disclosed, for example, in EP 3 315 381 A1, said clamping device also being denoted as a securing device and being able to be selectively moved into a fixed position for drive mode or into a released position for adjustment. In the released position the inner jacket is telescopically displaceable in the outer jacket and in the fixed position the inner jacket is releasably clamped to the outer jacket. The inner jacket is supported longitudinally in the direction of travel at the front, viewed from the driver's position, at the bottom on the vehicle body, and thus is also denoted as the front or lower jacket. The outer jacket, which is longitudinally displaceable relative to the carrier unit during adjustment, is correspondingly also denoted as the rear or upper jacket.

The outer jacket has a tubular body with a clamping slot extending longitudinally over a partial portion, the clamping device acting on the edge regions thereof in order to exert a clamping force in the peripheral direction which pulls together the clamping slot for the fixing, so that the internal cross section of the tubular body is narrowed and the inner jacket is clamped therein. The clamping force is introduced into the tubular body via side plates which are attached on opposing sides of the tubular body on either side of the clamping slot and which extend parallel to the longitudinal axis. A clamping bolt which is mounted in the carrier unit and which is fixed relative to the longitudinal direction penetrates longitudinally oriented elongated holes in the side plates which oppose one another in the peripheral direction.

For the longitudinal adjustment, when the clamping device is released the outer jacket may be displaced relative to the inner jacket and relative to the carrier unit in the direction of the longitudinal axis. In this case, the clamping bolt which is secured in the carrier unit in the longitudinal direction moves along the elongated holes.

When the clamping device is actuated for the fixing, a clamping force which loads the two side plates relative to one another is exerted by the clamping bolt via a lifting device, so that the clamping slot is pulled together and the inner jacket is fixedly clamped in the tubular body. At the same time, the clamping bolt may also penetrate the side limbs of the carrier unit, the outer jacket being received therebetween. Due to the clamping force exerted in the fixed position, the side limbs are clamped against the side plates so that the outer jacket is releasably fixed to the carrier unit.

In the aforementioned prior art, the two side plates are configured on an open profile part which is closed on its outer face remote from the tubular body, the edges thereof being connected to the tubular body on either side of the clamping slot. It has been shown to be a drawback that the clamping force, which is effectively transmitted to the tubular body for the fixing, varies as a function of the adjusted position in the longitudinal direction, which is associated with a different longitudinal position of the clamping bolt in the elongated hole.

Thus a need exists to permit a more uniform transmission of the clamping force that is more independent of the adjusted position.

SUMMARY

The present disclosure relates to a steering column for a motor vehicle, having an adjusting unit in which a steering spindle is rotatably mounted about a longitudinal axis and which has an outer jacket which may be adjustably secured to a carrier unit and which is able to be clamped to a telescopically adjustable inner jacket, wherein the outer jacket has a tubular body with a clamping slot which extends at least in some portions in the longitudinal direction, and two side plates which oppose one another on either side of the clamping slot relative to the longitudinal axis and which extend parallel to the longitudinal axis, said two side plates being connected to the tubular body and having in each case an elongated hole which is spaced apart from the tubular body and which extends in the longitudinal direction, wherein a clamping bolt of a clamping device is guided through the two elongated holes and at least one opening of the carrier unit, and a clamping force which loads the side plates relative to one another is able to be applied via the clamping bolt.

In a steering column for a motor vehicle, having an adjusting unit in which a steering spindle is rotatably mounted about a longitudinal axis and which has an outer jacket which may be adjustably secured to a carrier unit and which is able to be clamped to a telescopically adjustable inner jacket, wherein the outer jacket has a tubular body with a clamping slot which extends at least in some portions in the longitudinal direction, and two side plates which oppose one another on either side of the clamping slot relative to the longitudinal axis and which extend parallel to the longitudinal axis, said two side plates being connected to the tubular body and having in each case an elongated hole which is spaced apart from the tubular body and which extends in the longitudinal direction, wherein a clamping bolt of a clamping device is guided through the two elongated holes and at least one opening of the carrier unit, and a clamping force which loads the side plates relative to one another may be applied via the clamping bolt, according to the present disclosure it is provided that each side plate has in each case an outer region which freely protrudes from the tubular body remote from the axis and which comprises the elongated hole, and an inner region which is fixed to the tubular body in the vicinity of the axis, wherein in each case a support element is connected to a side plate between the elongated hole and the inner region and is connected to the tubular body in an edge region of the clamping slot.

According to the present disclosure, each side plate has an inner region, which is also denoted as an end region in the vicinity of the axis or in the vicinity of the jacket and which faces the tubular body and is connected thereto, and an outer region which is also denoted as the end region remote from the axis or external end region, and with its end opposing the inner region protrudes outwardly from the tubular body transversely to the longitudinal axis. The outer region forms a freely protruding end region which is at least not connected directly to the tubular body and also not connected directly to the other side plate. The elongated hole is arranged in the freely protruding outer region. This means that the side plate is exclusively connected to the tubular body in the internal region between the elongated hole and the inner end, viewed from the elongated hole.

An advantage of the present disclosure results from the freely protruding outer regions which are able to be clamped by the clamping force introduced by the clamping device in the region of the elongated holes, unhindered in the peripheral direction, and namely irrespective of the relative longitudinal position of the clamping bolt in the elongated hole. As a result, the transmission of the clamping force for fixing the inner and outer jacket is irrespective of the adjusted state of the steering column The support element, which is supported on the outer region, serves or forms a reinforcing element which reduces the elastic deformation of the side plate when the clamping device is clamped and thus ensures an improved and more uniform force transmission between the side plate and the tubular body.

According to the present disclosure, the advantageous transmission of the clamping force is further improved by each side plate being connected in its inner region to the tubular body on two peripheral regions spaced apart from one another in the peripheral direction. In this case, a first connection may take place in the inner end region in which the side plate is in direct contact with the jacket tube, for example lies tangentially against the tubular body from the outside. This first connection may preferably be designed as a direct connection, for example a joint connection such as a weld seam, the side plate being fixed thereby directly to the outer periphery of the tubular body without interposed connecting elements. A second connection according to the present disclosure is arranged between said first connection and the elongated hole. Here, according to the present disclosure, inserted between the side plate and the tubular body is a support element which protrudes from the side plate and, supported in the peripheral direction, is connected in an edge region of the clamping slot to the tubular body, preferably by a fixed joint connection such as a weld seam or the like. Via the support element, a direct optimized transmission of the clamping force introduced via the elongated holes is permitted into the region of the clamping slot, so that the exerted clamping force is in practice fully available for reducing the slot width and thus for the clamping, and namely irrespective of the adjusted state of the steering column.

The two side plates are arranged mirror-symmetrically on either side of the longitudinal axis. An optimized transmission of clamping force is permitted by the freely protruding outer regions according to the present disclosure and the additional reinforcing and fixing via the support element.

A side plate preferably extends between its inner and outer region parallel over the surface relative to a tangential plane of the preferably cylindrical tubular body. The freely protruding outer regions of the two side plates are located substantially parallel to one another—at an angle of less than 10°, preferably less than 5°. The elongated holes are aligned with one another and are penetrated by the clamping bolt in the peripheral direction, i.e. in a direction at right-angles to the longitudinal axis.

The clamping device may have in a manner known per se the clamping bolt which penetrates through the side plates transversely to the longitudinal axis and which is connected to an axial abutment and a clamping mechanism, wherein the abutment is supported from outside against the one side plate and the clamping gear is supported from outside against the other side plate. The clamping mechanism may have in a manner known per se a lifting mechanism which, when an actuating element is actuated, for example by rotating the clamping bolt by means of a manually operable clamping lever, exerts on the clamping bolt an axial clamping stroke and thereby a clamping force, which pulls together the two side plates against one another. Such clamping devices are known in principle and may have as a lifting mechanism, for example, a wedge, cam or tilting pin arrangement which converts a rotation of the clamping bolt into an axial clamping stroke or a clamping force.

As an alternative to an actuating lever, the clamping device may also be actuated by a motorized drive.

The side plates and/or the support elements may be configured to be plate-shaped. These may be efficiently provided as substantially planar sheet metal parts or sheet metal blanks, for example as stamped parts, preferably from sheet steel.

An advantageous embodiment is that the side plates, the support elements and the tubular body have sheet metal formed parts. Sheet metal formed parts may be manufactured so as to be optimized in terms of application and in a cost-effective manner, preferably by cold forming methods, such as pressing, stamping and the like, preferably from sheet steel.

Preferably it may be provided that the side plates, the support elements and/or the tubular body are connected together via joint connections. The joint connections may preferably be designed as unreleasable, substance-to-substance joint connections, for example by laser welding or the like. Weld seams may be generated at intervals or at least in some portions continuously along the length, said weld seams permitting connections which are permanently resilient and secure, with little manufacturing complexity.

According to the present disclosure, the side plates and the support elements may be provided as simply formed sheet metal blanks and the tubular body as a tubular material portion. The joint connections permit an efficient construction and production of a dimensionally stable construction from individual parts which are available cost-effectively, such that the advantages according to the present disclosure may be implemented with little effort.

A side plate may be directly connected in its inner region to the tubular body. The connection may comprise, for example, a weld in the region in the vicinity of the axis, in which the side plate lies tangentially against the cylindrical tubular body from the outside. For example, a weld seam may be placed between the edge on the inner end of the side plate and the outer periphery of the tube body. In this manner, a first connection may be produced with little effort as described above. It may be provided that a support element is connected to a side plate between the inner region and the outer region. As the support element has a spacing from the inner region, the inner region may have a first connection to the tubular body and the support element may have a second connection. The first connection and the second connection may be spaced apart on the outer periphery of the tubular body in the peripheral direction. The spaced-apart connections permit an optimized introduction and transmission of the clamping force.

Preferably, a support element may be connected to the side plate in each case in an edge region of an elongated hole. The clamping force is introduced into the side plate via the clamping bolt in the region of the elongated hole. As the support element is connected to the side plate with a relatively small spacing adjacent to the elongated hole, for example by means of a weld, the elastic deformation may be reduced during the clamping, whereby the transmission of clamping force is optimized.

A support element may preferably protrude at an angle from a side plate. As a result, the clamping force may be introduced into the tubular body in a simple manner in the peripheral direction via the support element from the tangentially extended side plate. The arrangement permits an optimized force transmission and a high degree of stiffness.

An advantageous embodiment may provide that the support elements are connected to the tubular body on a peripheral portion facing the clamping slot, and the inner regions are connected to the tubular body on a peripheral portion remote from the clamping slot. According to the present disclosure, relative to the longitudinal axis the outer regions of the side plates freely protrude from the peripheral portion which has the clamping slot, in other words the half-periphery having the clamping slot. For a high degree of stiffness it is advantageous if the support elements are also arranged in this peripheral region, as described above. As the inner regions are preferably connected to the tubular body by a direct connection in the region of the half-periphery opposing the clamping slot, the elastic deformations occurring during the clamping may be kept small such that no functional impairments occur.

It is possible that the tubular body is configured to be hollow-cylindrical at least in some portions. This permits an efficient manufacture from a cylindrical tubular portion. The clamping of the circular inner cross section on a cylindrical inner jacket is also facilitated.

In an advantageous embodiment it may be provided that the side plate, the tubular body and the support element form a type of tunnel-shaped through-passage which extends in the longitudinal direction and preferably runs outside along the jacket tube. The advantage of the tunnel-shaped through-passage is that it provides a protected space, for example as a cable duct for guiding through cables along the adjusting unit, for example for a steering column switch.

An advantageous embodiment is that the side plates are arranged between the side limbs of the carrier unit which are penetrated by the clamping bolt and which are able to be clamped against the side plates. The carrier unit has two side limbs which are downwardly oriented transversely to the longitudinal axis, the outer jacket being able to be arranged therebetween so as to be displaceable upwardly and downwardly for producing a vertical adjustment in the vertical direction. In the fixed position the side limbs may be clamped with the clamping force by the clamping device against the side plates of the outer jacket, such that the steering column is fixed in the vertical direction. As a result, the clamping force serves for fixing in the longitudinal and vertical direction at the same time, wherein an optimized function is made possible by the present disclosure irrespective of the adjusted state of the steering column.

DETAILED DESCRIPTION

Figure 1:
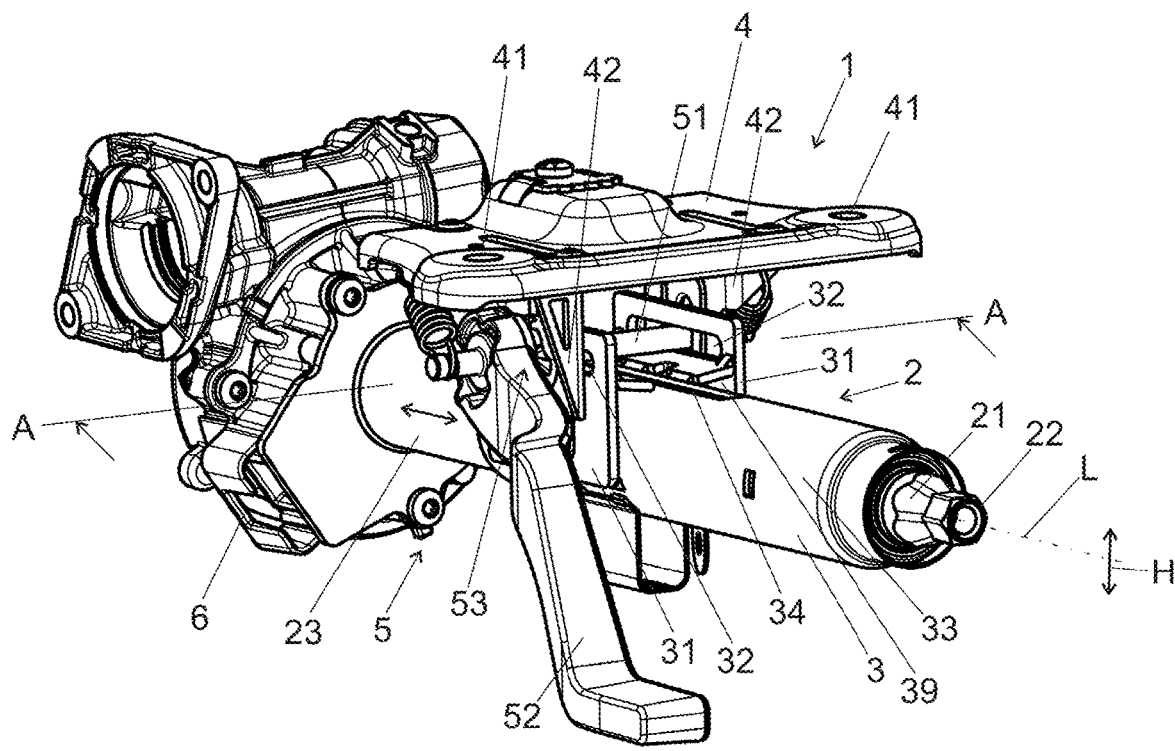
FIG. 1 is a schematic perspective view of an example steering column.

In the various figures the same parts are provided with the same reference numerals and thus are generally only cited or mentioned once in each case. Further, although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 2:
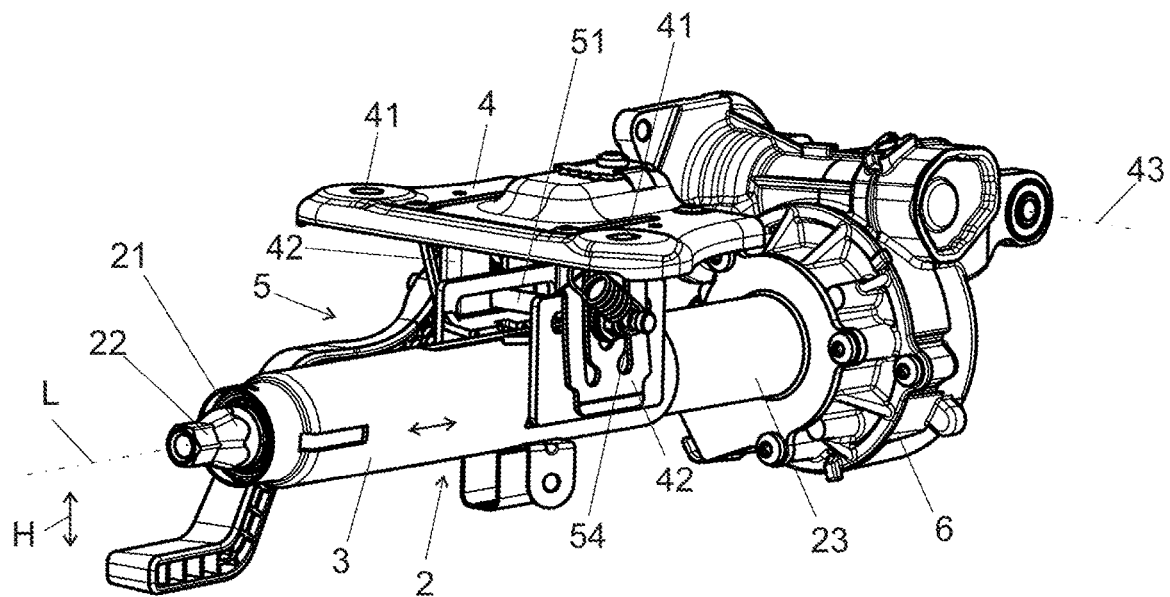
FIG. 2 is another schematic perspective view of the steering column according to FIG. 1.
Figure 3:
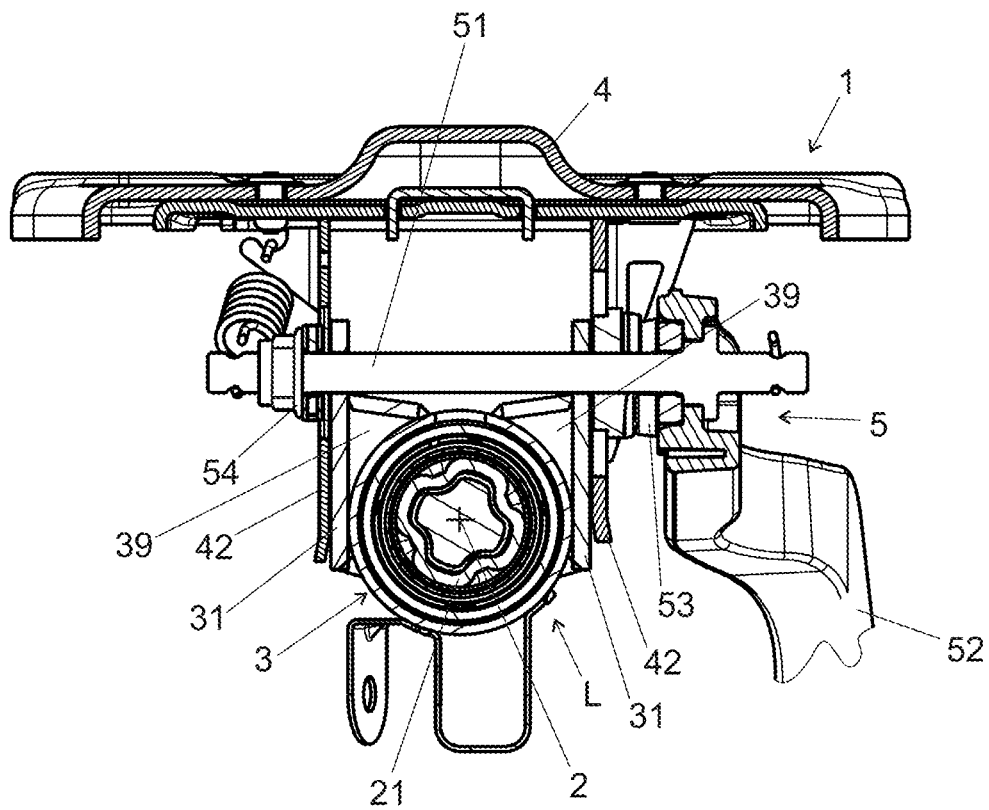
FIG. 3 is a cross-sectional view through the steering column according to FIGS. 1 and 2.

FIGS. 1 and 2 show a steering column 1 according to the present disclosure in different perspective views, FIG. 1 relative to the direction of travel from the rear left and FIG. 2 from the rear right. FIG. 3 shows a cross section A-A according to FIG. 1.

The steering column 1 comprises an adjusting unit 2 in which a steering spindle 21 is rotatably mounted about a longitudinal axis L extending in the longitudinal direction. On its rear or upper end facing the driver's position, the steering spindle 21 has a fastening portion 22 for attaching a steering wheel, not shown.

The adjusting unit 2 comprises an inner jacket 23 which is arranged in the front or lower region and thus is also denoted as the lower jacket. The tubular, in the example shown cylindrical, inner jacket 23 is received in a telescopically adjustable manner in the longitudinal direction in an outer jacket 3 which is designed according to the present disclosure, as indicated by the double arrow. The outer jacket 3 is also synonymously denoted as the upper jacket and bears the steering spindle 21 with the fastening portion 22.

The outer jacket 3 has two side plates 31 which are arranged on either side of the longitudinal axis L. The side plates 31 have elongated holes 32 which extend in the longitudinal direction and which oppose one another in a congruent manner transversely to the longitudinal axis L.

A carrier unit 4 has fastening openings 41 for attaching to a vehicle body, not shown. Two side limbs 42 extend downwardly from the carrier unit 4. The outer jacket 3 is received between the side limbs 42, wherein the side limbs 42 lie against the side plates 31 from the outside.

A clamping device 5 comprises a clamping bolt 51 which is rotatably mounted in the side limbs 42 and guided through the elongated holes 32 transversely to the longitudinal axis L. For the vertical adjustment, the clamping bolt 51 may be guided in the vertical direction H in the side limbs 42.

A clamping lever 52 is attached to the clamping bolt 51, the clamping bolt 51 being able to be rotated thereby about its axis.

At one end facing the viewer in FIG. 1, the clamping device 5 has a lifting gear 53 which is supported externally on the one side limb 42 and cooperates with the clamping bolt 51. At the other end facing the viewer in FIG. 2, the clamping bolt 51 is supported from outside against the other side limb 42 in a tension-resistant manner via an abutment 54.

By manual actuation of the clamping lever 52, the clamping bolt 51 may be rotated for the fixing, whereby the lifting gear 53 exerts a clamping stroke on the clamping bolt 42 which pulls together the two side limbs 42 against one another, and clamps against the side plates 31 with the exerted clamping force F.

If the clamping device 5 is moved into the released position by actuation in the opposing direction, the outer jacket 3 together with the steering spindle 21 may be moved forward or backward relative to the carrier unit 4 for setting different longitudinal adjustments in the longitudinal direction, wherein the clamping bolt 51 moves along the elongated holes 32.

Figure 4:
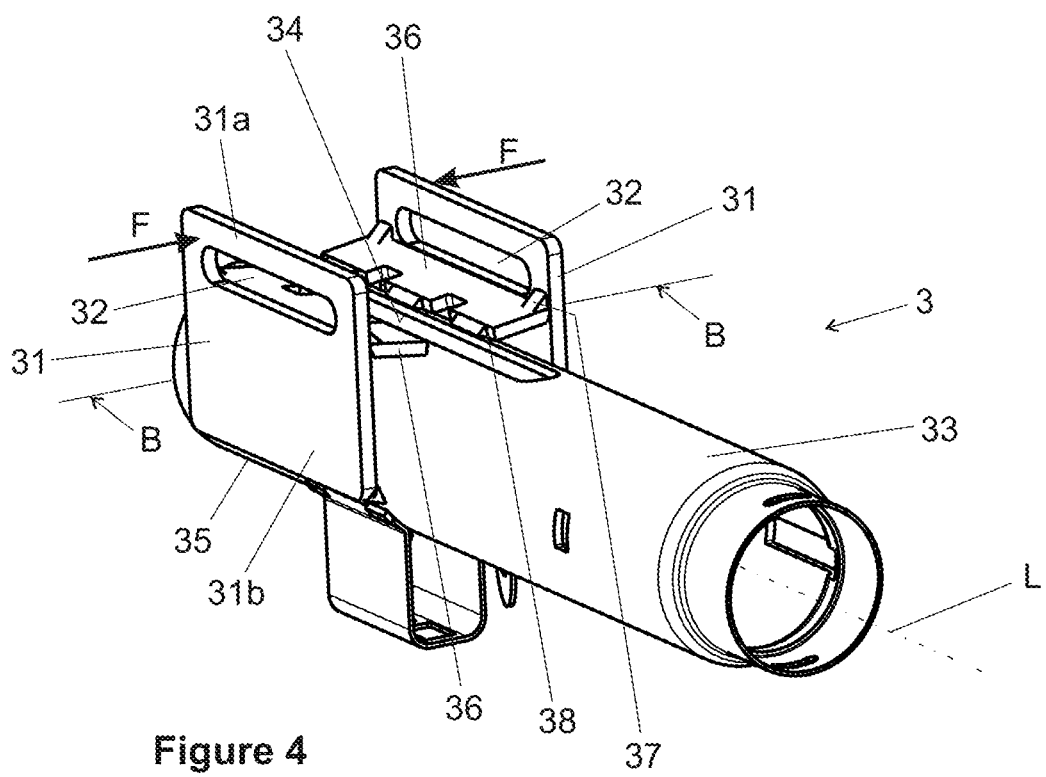
FIG. 4 is a detached perspective view of an example outer jacket of the steering column according to FIGS. 1 to 3.
Figure 5:
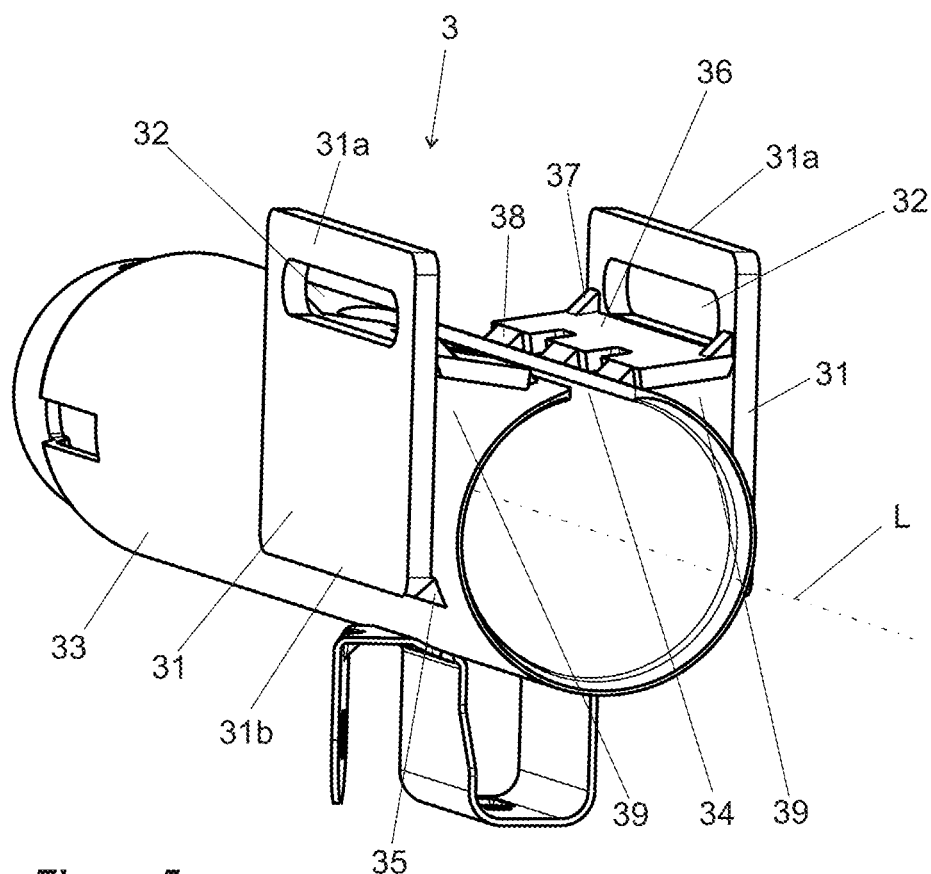
FIG. 5 is another perspective view of the example outer jacket according to FIG. 4.
Figure 6:
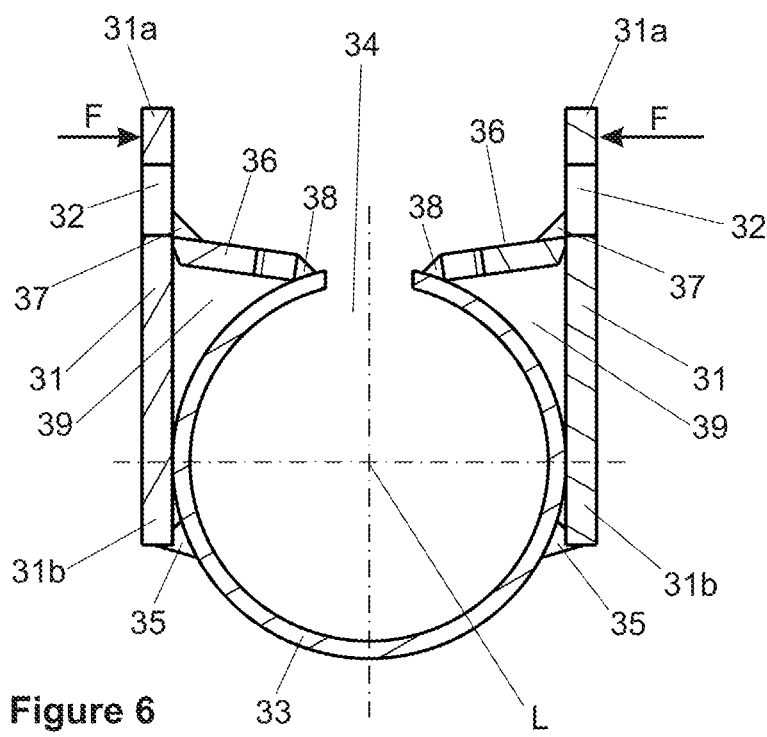
FIG. 6 is a cross-sectional view through the outer jacket according to FIG. 4.

The outer jacket 3 is shown detached in FIGS. 4 and 5 in different perspective views, and in FIG. 5 in a cross section B-B according to FIG. 4.

The outer jacket 3 has a hollow-cylindrical tubular body 33 which has a clamping slot 34 in the upper half-periphery thereof. The clamping slot 34 extends parallel to the longitudinal axis L over a partial portion of the length in the region in which the side plates 31 are attached and beyond said region.

As may be clearly identified in FIGS. 3 to 6, the side plates 31 are configured to be plate-shaped, for example as substantially planar sheet metal portions which extend parallel to the longitudinal axis L.

The elongated holes 32 are arranged in each case in an outer region 31*a* of the side plate 31 protruding freely from the tubular body 33. In this case, even when the fixing takes place via the clamping bolt 51 guided through the elongated holes 32, the clamping force F is applied from outside onto the side plates 31 as illustrated schematically in FIGS. 4 and 6.

In the inner region 31*b* which faces away from the free outer region 31*a*, the side plate 31 lies tangentially against the tubular body 33 from the outside, and namely approximately level with the longitudinal axis L. For connecting to the tubular body 33 in each case a joint connection 35 is configured on the edge of the inner region 31*b*, for example weld seams. In this case, these joint connections 35 are located on the lower half-periphery of the tubular body 33 opposing the clamping slot 34 relative to the longitudinal axis L.

In each case a support element 36 which is of plate-shaped configuration, for example also as a substantially planar sheet metal portion, is arranged between the outer region 31*a* of a side plate 31 and the tubular body 33. The support element 36 is connected to the side plate 31 via a joint connection 37 which is preferably configured as a weld seam and which is arranged between the elongated hole 32 and the inner region 31*b* on the side plate 31, preferably in the vicinity of the elongated hole 32.

By means of a further joint connection 38, for example also a weld, the support element 36 is fixedly connected to the tubular body 33 in the edge region of the clamping slot 34.

The clamping force F exerted on the side plates 31 is introduced uniformly via the support elements 36 irrespective of the set longitudinal position, so that the manual actuating force required for fixing the clamping device 5 remains uniform.

The sheet metal portions of the side plates 31 and the support elements 36 may preferably be configured from steel, in the same manner as the tubular body 33.

The side plate 31, the tubular body 33 and the support element 36 form a tunnel-shaped through-passage 39 which extends in the longitudinal direction L and runs along the outside of the outer jacket 3 in the manner of a cable duct.

For the vertical adjustment, the adjusting unit 2 may be pivotable in the vertical direction relative to the vehicle body about a horizontal pivot axis 43 located transversely to the longitudinal axis L in the front or lower region.

An electromotive drive 6 which is connected to the inner jacket 23 may be provided, and a torque generated by motor may be introduced thereby into the steering spindle 21, for example an auxiliary torque for steering assistance in a power-assisted steering system or even a feedback torque as a simulated manual feedback with a steer-by-wire steering system.

LIST OF REFERENCE NUMERALS

1 Steering column
2 Carrier unit
21 Steering spindle
22 Fastening portion
23 Inner jacket
3 Outer jacket
31 Side plate
31*a* Outer region
31*b* Inner region
32 Elongated hole
33 Tubular body
34 Clamping slot
35 Joint connection
36 Support element
37, 38 Joint connection
39 Through-passage
4 Carrier unit
41 Fastening openings
42 Side limb
43 Pivot axis
5 Clamping device
51 Clamping bolt
52 Clamping lever
53 Lifting gear
54 Abutment
6 Drive

The invention claimed is:

1. A steering column for a motor vehicle, comprising:
an adjusting unit in which a steering spindle is rotatably mounted about a longitudinal axis, the adjusting unit including an outer jacket that is configured to be adjustably secured to a carrier unit and that is configured to be clamped to a telescopically adjustable inner jacket, wherein the outer jacket comprises:
a tubular body with a clamping slot that extends at least in part in a longitudinal direction, and
two side plates that oppose one another on either side of the clamping slot relative to the longitudinal axis and that extend parallel to the longitudinal axis, the two side plates are tangential and connected to the tubular body and each having an elongated hole that is spaced apart from the tubular body and that extends in the longitudinal direction; and
a clamping bolt of a clamping device extending through the two elongated holes and an opening of the carrier unit, wherein the clamping bolt is configured to apply a clamping force that loads the side plates relative to one another,
wherein each of the two side plates includes:
an outer region that protrudes from the tubular body distal the longitudinal axis and that comprises one of the elongated holes,
an inner region that is fixed to the tubular body proximate the longitudinal axis,
wherein in each case a support element is connected to one of the side plates between the respective elongated hole and the respective inner region, each support element being connected to the tubular body at an edge region of the clamping slot.

2. The steering column of claim 1 wherein the side plates and/or the support elements are plate-shaped.

3. The steering column of claim 1 wherein the side plates, the support elements, and/or the tubular body are comprised of sheet metal.

4. The steering column of claim 1 wherein the side plates, the support elements, and the tubular body are connected together via joint connections.

5. The steering column of claim 1 wherein the inner region of one of the side plates is directly connected to the tubular body.

6. The steering column of claim 1 wherein one of the support elements is connected to one of the side plates between the inner region and the outer region.

7. The steering column of claim 1 wherein each support element is connected to the respective side plate in an edge region of the respective elongated hole.

8. The steering column of claim 1 wherein one of the support elements protrudes at an angle from the respective side plate.

9. The steering column of claim 1 wherein the support elements are connected to the tubular body on a peripheral portion facing the clamping slot, wherein the inner regions of the side plates are connected to the tubular body on a peripheral portion remote from the clamping slot.

10. The steering column of claim 1 wherein the tubular body is hollow-cylindrical at least in some portions.

11. The steering column of claim 1 wherein the side plates are arranged between side limbs of the carrier unit that are penetrated by the clamping bolt and that are configured to be clamped against the side plates.

12. The steering column of claim 1 wherein the side plates, the tubular body, and the support elements form a tunnel-shaped through-passage that extends in the longitudinal direction.

13. The steering column of claim 1, wherein the side plates are tangential to the tubular body.

14. A steering column for a motor vehicle, comprising:
an adjusting unit in which a steering spindle is rotatably mounted about a longitudinal axis, the adjusting unit including an outer jacket that is configured to be adjustably secured to a carrier unit and that is configured to be clamped to a telescopically adjustable inner jacket, wherein the outer jacket comprises:
a tubular body with a clamping slot that extends at least in part in a longitudinal direction, and
two side plates that oppose one another on either side of the clamping slot relative to the longitudinal axis and that extend parallel to the longitudinal axis, the two side plates being connected to the tubular body and each having an elongated hole that is spaced apart from the tubular body and that extends in the longitudinal direction; and
a clamping bolt of a clamping device extending through the two elongated holes and an opening of the carrier unit, wherein the clamping bolt is configured to apply a clamping force that loads the side plates relative to one another,
wherein each of the two side plates includes:
an outer region that protrudes from the tubular body distal the longitudinal axis and that comprises one of the elongated holes,
an inner region that is fixed to the tubular body proximate the longitudinal axis,
wherein in each case a support element is connected to one of the side plates between the respective elongated hole and the respective inner region, each support element being connected to the tubular body at an edge region of the clamping slot, and wherein one of the support elements protrudes at a non-90-degree angle from the respective side plate.

15. A steering column for a motor vehicle, comprising:
an adjusting unit in which a steering spindle is rotatably mounted about a longitudinal axis, the adjusting unit including an outer jacket that is configured to be adjustably secured to a carrier unit and that is configured to be clamped to a telescopically adjustable inner jacket, wherein the outer jacket comprises:
a tubular body with a clamping slot that extends at least in part in a longitudinal direction, and
two side plates that oppose one another on either side of the clamping slot relative to the longitudinal axis and that extend parallel to the longitudinal axis, the two side plates being connected to the tubular body, and each having an elongated hole that is spaced apart from the tubular body and that extends in the longitudinal direction, and wherein each side plate includes at least one longitudinally extending end not contacting the tubular body; and
a clamping bolt of a clamping device extending through the two elongated holes and an opening of the carrier unit, wherein the clamping bolt is configured to apply a clamping force that loads the side plates relative to one another,
wherein each of the two side plates includes:
an outer region that protrudes from the tubular body distal the longitudinal axis and that comprises one of the elongated holes, an inner region that is fixed to the tubular body proximate the longitudinal axis, wherein in each case a support element is connected to one of the side plates between the respective elongated hole and the respective inner region, each support element being connected to the tubular body at an edge region of the clamping slot.

16. The steering column of claim 15, wherein the each side plate further includes at least one end connected to the tubular body by a weld.

\* \* \* \* \*